US009897191B2

United States Patent
Tamura et al.

(10) Patent No.: US 9,897,191 B2
(45) Date of Patent: Feb. 20, 2018

(54) TORQUE ARM STRUCTURE

(71) Applicant: Sumitomo Heavy Industries, Ltd., Tokyo (JP)

(72) Inventors: Mitsuhiro Tamura, Aichi (JP); Hidetaka Yamashita, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 516 days.

(21) Appl. No.: 14/560,768

(22) Filed: Dec. 4, 2014

(65) Prior Publication Data
US 2015/0226313 A1 Aug. 13, 2015

(30) Foreign Application Priority Data

Feb. 12, 2014 (JP) ................................. 2014-024078

(51) Int. Cl.
*F16H 35/10* (2006.01)
*H02K 7/116* (2006.01)
*F16H 57/025* (2012.01)
*B65G 23/24* (2006.01)
*F16H 57/02* (2012.01)

(52) U.S. Cl.
CPC ........... *F16H 57/025* (2013.01); *B65G 23/24* (2013.01); *F16H 2057/02034* (2013.01); *F16H 2057/02073* (2013.01); *Y10T 74/2183* (2015.01)

(58) Field of Classification Search
CPC ........ B65G 23/00; B65G 23/22; B65G 23/24; F16H 57/025; F16H 2057/02034; F16H 35/10; F16H 57/023; H02K 7/116
See application file for complete search history.

(56) References Cited

U.S. PATENT DOCUMENTS

| 3,869,884 A | * | 3/1975 | Deadman | ................ D06F 45/00 100/172 |
| 6,144,307 A | * | 11/2000 | Elliot | ....................... B66D 1/58 340/665 |
| 7,942,078 B2 | * | 5/2011 | Leimann | ............... F16H 57/025 248/205.1 |

(Continued)

FOREIGN PATENT DOCUMENTS

CN 101031398 A 9/2007
CN 201326660 * 10/2009 ............... F16D 3/14

(Continued)

OTHER PUBLICATIONS

Derwent Abstract of CUI, CN 201326660, Mar. 2008.*
Office Action issued in Chinese Patent Application No. 201410608973.3, dated Dec. 5, 2016.

*Primary Examiner* — Burton Mullins
(74) *Attorney, Agent, or Firm* — Michael Best & Friedrich LLP

(57) ABSTRACT

A torque arm structure includes a first member which is fixed to the reduction gear or a member integrated with the reduction gear, and a second member which is fixed to an outer member to oppose the first member, and an elastic member configured to transmit a load by which the reduction gear is rotated around the output shaft from the first member to the second member. The elastic member is to be fitted into a gap between the first member and the second member and is detachably disposed in the gap.

8 Claims, 11 Drawing Sheets

(56) References Cited

U.S. PATENT DOCUMENTS

| | | | | |
|---|---|---|---|---|
| 2003/0074994 A1* | 4/2003 | Isozaki | ............... | F16H 57/033 74/421 A |
| 2007/0246634 A1* | 10/2007 | Leimann | ............... | F16M 7/00 248/637 |
| 2008/0073994 A1* | 3/2008 | Fedder | ............... | H02K 7/003 310/112 |

FOREIGN PATENT DOCUMENTS

| | | | | |
|---|---|---|---|---|
| CN | 103225694 A | | 7/2013 | |
| DE | 10302698 | * | 7/2004 | ............. F16D 43/20 |
| EP | 2 495 433 A1 | | 9/2012 | |
| JP | H09-093850 A | | 4/1997 | |
| JP | 2003299295 | * | 10/2003 | ............... H05K 5/00 |
| JP | 2008002475 A | * | 1/2008 | ............. H02K 7/116 |
| JP | 2008-026472 A | | 2/2008 | |
| JP | 2009-228770 A | | 10/2009 | |
| WO | WO-2006/015839 A1 | | 2/2006 | |

\* cited by examiner

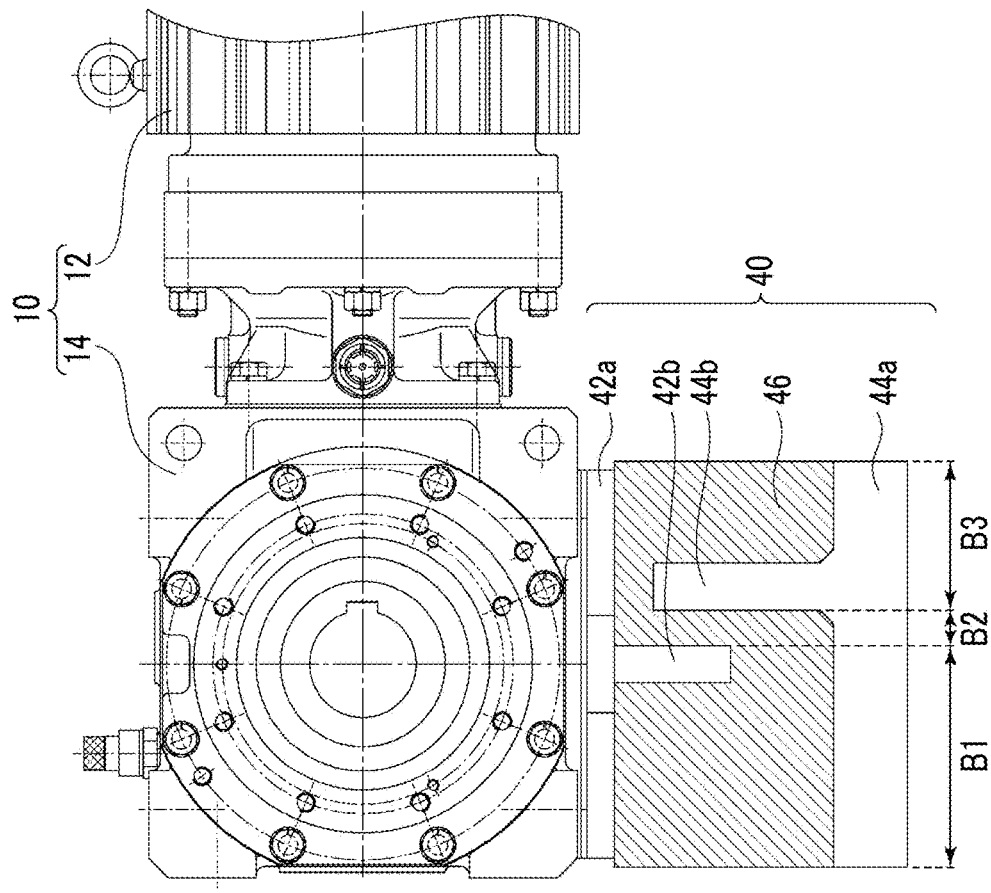
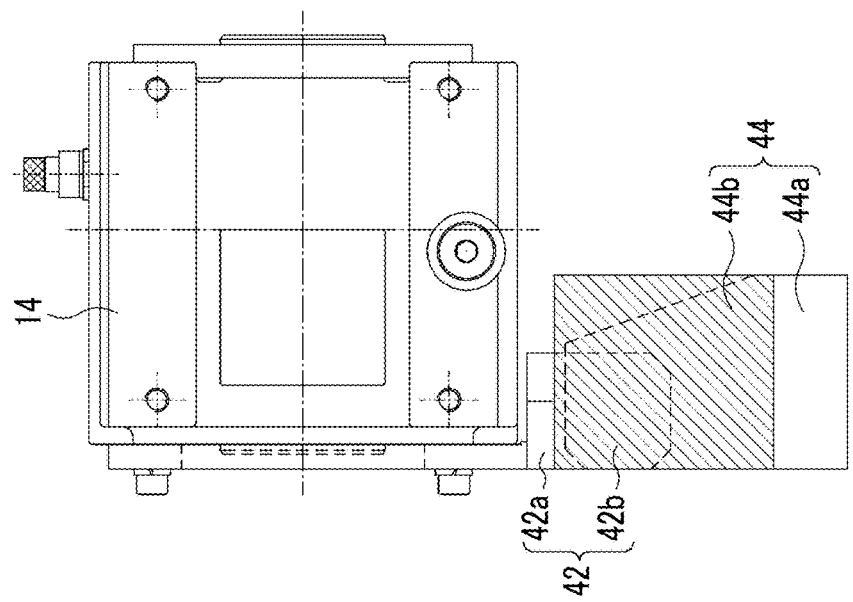

TORQUE ARM STRUCTURE

RELATED APPLICATIONS

Priority is claimed to Japanese Patent Application No. 2014-024078, filed Feb. 12, 2014, the entire content of which is incorporated herein by reference.

BACKGROUND

Technical Field

The present invention relates to a torque arm structure.

Description of Related Art

A gear motor is used in a suspension system of a large-sized movable device such as a crane or is used to drive rollers of a conveyor belt, and is widely applied. In general, the gear motor includes a motor and a reduction gear, and a driven shaft of a mating machine is used and is attached to an output shaft of the reduction gear. Generally, since the mating machine is relatively heavy, it is necessary to install a rotation stopping structure such as a torque arm structure which prevents the gear motor from being rotated during driving.

As an example of the rotation stopping structure, for example, in the related art, a rotating machine supporting structure is disclosed in which a case of a rotating machine is supported by a single supporting rod protruding from the case and a U shaped rotation stopping body connected to the supporting rod.

SUMMARY

According to an embodiment of the present invention, there is provided a torque arm structure configured to prevent rotation around an output shaft of a reduction gear, including: a first member which is fixed to the reduction gear or a member integrated with the reduction gear; a second member which is fixed to an outer member and opposes the first member; and an elastic member configured to transmit a load by which the reduction gear is to be rotated around the output shaft from the first member to the second member. The elastic member is fitted into a gap between the first member and the second member and is detachably disposed in the gap.

BRIEF DESCRIPTION OF THE DRAWINGS

FIGS. 4A and 4B are a side view and a front view of an example of the torque arm structure according to the present embodiment.

DETAILED DESCRIPTION

Figure 1:
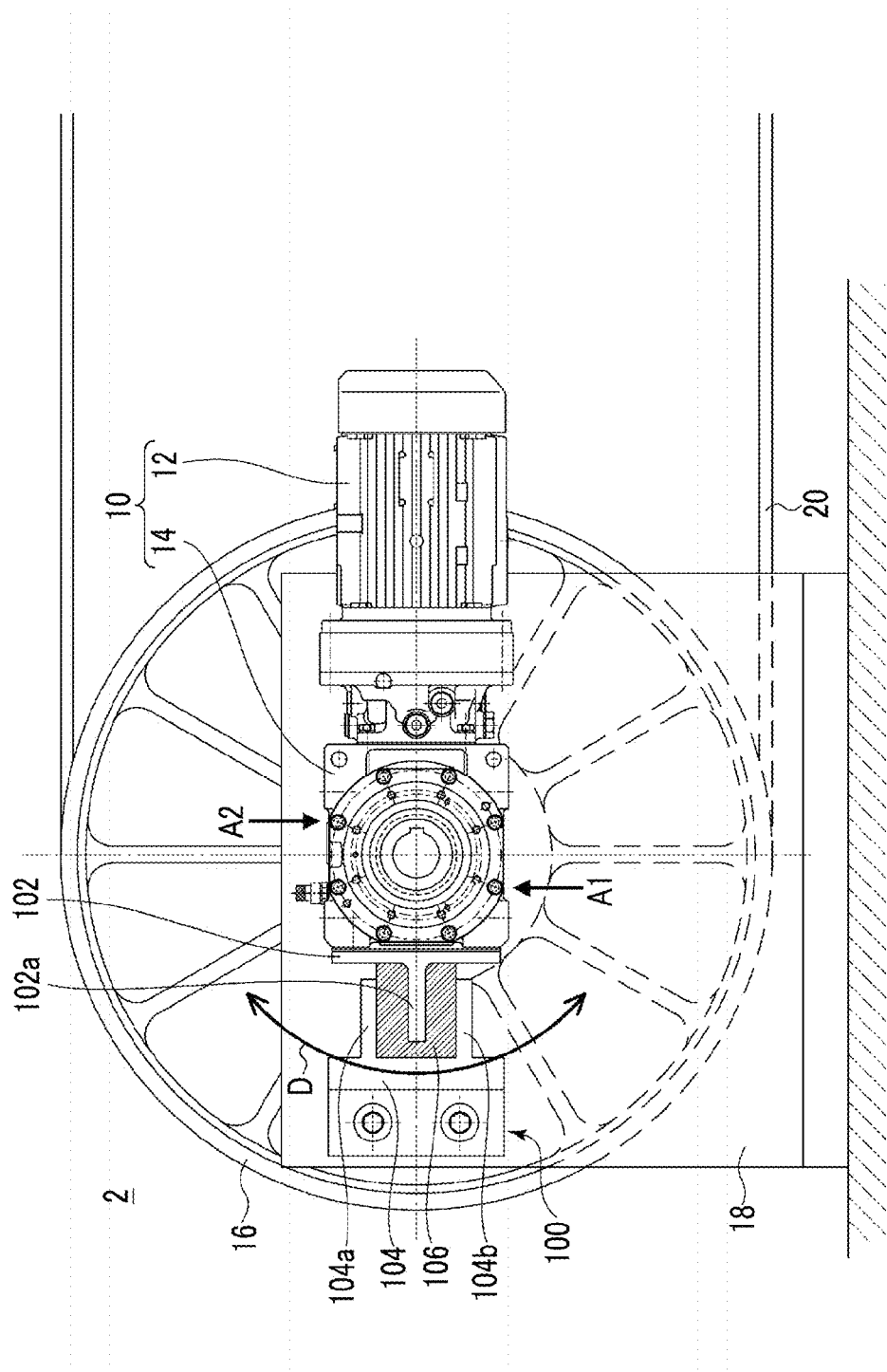
FIG. 1 is a side view of a conveyor belt system including a gear motor, and a torque arm structure according to an embodiment of certain embodiments of the invention.

In the rotation stopping structure of the related art, an elastic member fixed to a wall of a rotation stopping body is disposed between a supporting rod and a U shaped rotation stopping body. In this configuration, when the elastic member is damaged or deteriorates over time, there is a problem in that the elastic member is difficult to be removed and maintenance performance is decreased.

Accordingly, it is desirable to provide a torque arm structure in which maintenance is easy.

According to certain embodiments of the invention, since the elastic member can be removed in a state where the first member and the second member are attached, changing the elastic member is easy, and maintenance performance of the torque arm structure is increased.

Moreover, arbitrary combination of the above-described elements, or replacement of elements or expressions in certain embodiments of the invention in a device, a method, a system, or the like is effective in aspects of certain embodiments of the invention.

According to certain embodiments of the invention, it is possible to provide a torque arm structure in which maintenance is easy.

Hereinafter, the same reference numerals are assigned to the same or equivalent components or members shown in each drawing, and overlapping descriptions thereof are appropriately omitted. Moreover, dimensions of members in each drawing are appropriately shown enlarged or reduced for easy understanding. In addition, portions of members which are not important for describing embodiments in each drawing are omitted.

Figure 2:
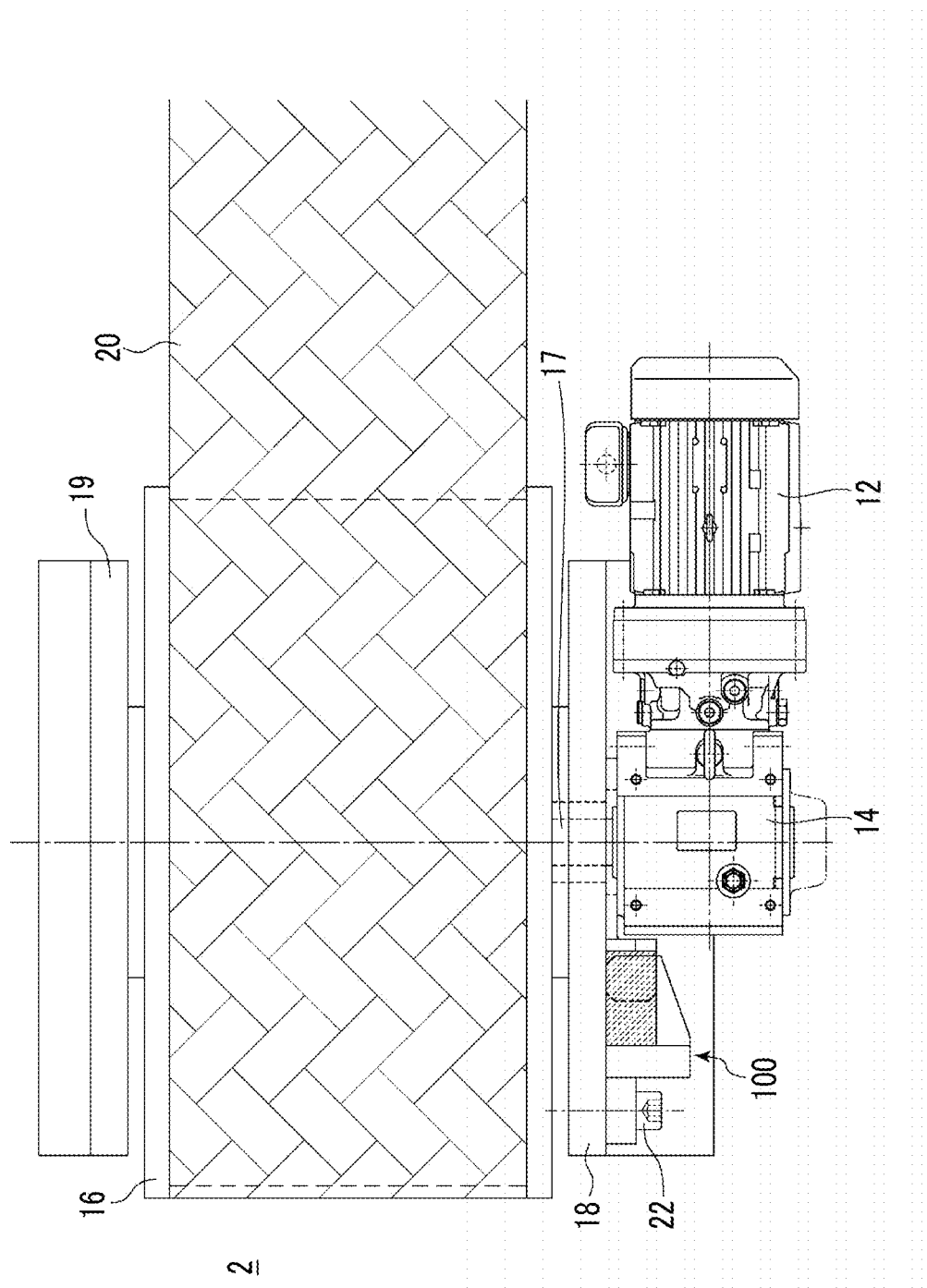
FIG. 2 is a side view of the conveyor belt system of FIG. 1.

FIG. 1 is a side view of a belt conveyer system 2 including a gear motor 10 and a torque arm structure 100 according to one embodiment of certain embodiments of the invention, and FIG. 2 is a plan view of the conveyor belt system 2. The conveyor belt system 2 includes a conveyor belt 20, a drive roller 16, a first frame 18, a second frame 19, and one or a plurality of driven rollers (not shown).

The drive roller 16 and the driven roller are disposed to substantially arrange in a horizontal direction. The conveyor belt 20 is wound around the rollers. One end of a shaft (a shaft of the driven roller is not shown) of each of the drive roller 16 and the driven roller is rotatably attached to the first frame 18 via a bearing (not shown), and the other end is rotatably attached to the second frame 19 via a bearing (not shown). The first frame 18 and the second frame 19 are fixed to the floor of a building such as a factory in which the conveyor belt system 2 is disposed.

The shaft (hereinafter, referred to as a driven shaft) 17 of the drive roller 16 penetrates the first frame 18, and accordingly, includes a portion (hereinafter, referred to as an exposed portion) of the first frame 18 exposed to a side opposite to the drive roller 16.

The gear motor 10 is attached to the exposed portion of the driven shaft 17 and rotates the drive roller 16. The gear motor 10 includes a motor 12 and a reduction gear 14. The motor 12 is an electric motor and is not controlled by an inverter (does not include the inverter). The motor 12 stops, or otherwise, is operated at a specified input voltage or a specified input power. The reduction gear 14 is an orthogonal reduction gear, and an input shaft thereof is approximately perpendicular to an output shaft thereof.

The reduction gear 14 is positioned between the motor 12 which is a drive machine and a drive roller 16 which is a driven machine. The reduction gear 14 transmits the rotation of the motor 12 to the drive roller 16. In this case, the reduction gear 14 converts a rotational speed and a rotation torque supplied to the input shaft (not shown) of the reduction gear 14 by the motor 12 into a rotational speed and a rotation torque required in the drive roller 16, and supplies the converted speed and torque to the driven shaft 17 via the output shaft of the reduction gear 14.

The output shaft of the reduction gear 14 is mechanically connected to the driven shaft 17 of the drive roller 16. The output shaft may be hollow, the driven shaft 17 may be solid, or it may be the opposite. Particularly, the output shaft is connected to the driven shaft to limit a relative rotation with respect to the driven shaft. In the present embodiment, the driven shaft 17 is inserted into a hollow portion of the output shaft of the reduction gear, and the driven shaft and the output shaft are connected to each other by a key.

The torque arm structure 100 prevents the gear motor 10 from rotating (in a direction shown by an arrow D in FIG. 1) around the driven shaft 17 (and the output shaft of the reduction gear 14) of the drive roller 16. The torque arm structure 100 includes a first structure 102 which is fixed to the reduction gear 14, a second structure 104 which is fixed to the first frame 18 of the drive roller 16 by a bolt 22, and an elastic member 106 which transmits a load by which the reduction gear 14 is to be rotated around the output shaft (driven shaft 17) from the first structure 102 to the second structure 104.

Figure 10:
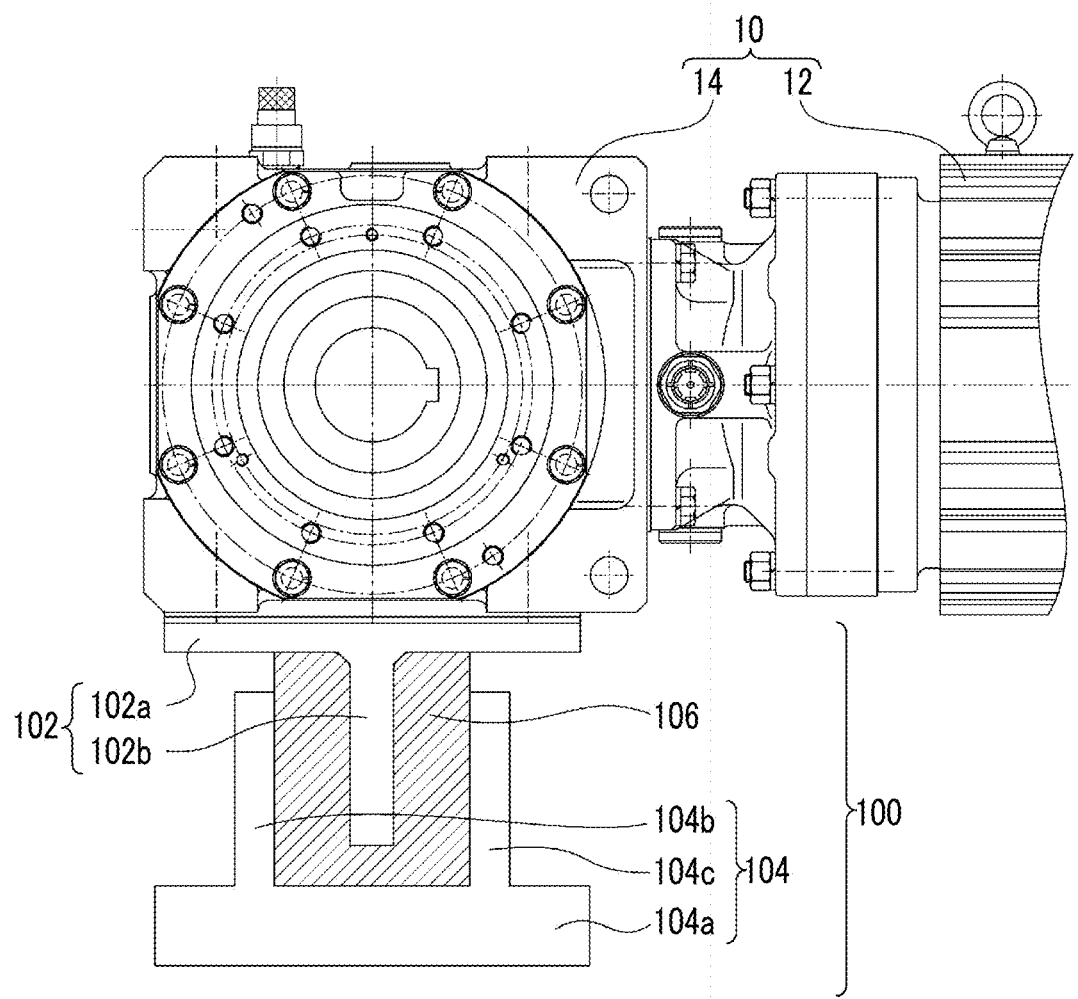
FIG. 10 is a view showing a torque arm structure according to a sixth modification.

In addition, FIGS. 1 and 2 show an aspect, in which the torque arm structure 100 according a sixth modification described below with reference to FIG. 10 is attached to the torque arm structure according to the present embodiment. However, all torque arm structures 40, 50, 60, 70, 80, 90, and 110 described below may be replaced by the torque arm structure 100 shown in FIGS. 1 and 2. The torque arm structures will be described in detail with reference to the drawings.

The torque arm structure 100 prevents the gear motor 10 from being rotated around the driven shaft 17. When the torque arm structure 100 is removed from the gear motor 10, the angular position of the gear motor 10 with respect to the driven shaft 17 becomes unstable. The torque arm structure 100 supports the gear motor 10 so that the angular position of the gear motor 10 with respect to the driven shaft 17 is approximately constant. Particularly, the torque arm structure 100 applies a rotational reaction force to the gear motor 10. As an example, a posture of the gear motor 10 is determined by only the torque arm structure 100.

An operation of the conveyor belt system 2 configured as above will be described. An operator turns on a power switch of the motor 12 to start the conveyor belt system 2. Accordingly, the same voltage as at the time of a normal operation is applied to the motor 12 (full voltage starting or line starting). In this case, a large amount of impact load (or starting torque) is generated in the gear motor 10 by gears inside the reduction gear 14 or by inertia of the drive roller 16. The impact load operates to cause the gear motor 10 to rotate around the driven shaft 17. The torque arm structure 100 supports the gear motor 10 with respect to the first frame 18 so that the gear motor 10 is not rotated by the impact load. In this case, the elastic member 106 of the torque arm structure 100 is shrunk, and thus, the elastic member allows the gear motor 10 to slightly rotate around the driven shaft 17. Accordingly, the impact generated when the motor 12 starts is distributed. Also when the conveyor belt system 2 stops, similarly, the torque arm structure 100 absorbs the impact load. In this way, adverse effects to the gear motor 10 due to the impact load can be decreased, and the life span of the gear motor 10 can be lengthened.

FIGS. 1 and 2 show the aspect in which the torque arm structure 100 is attached to a surface opposite to the surface of the reduction gear 14 which is connected to the motor 12. However, the torque arm structure according the present embodiment may be attached to a side surface indicated by A1 in FIG. 1 or a side surface indicated by A2. In addition, if a gap between the reduction gear 14 and the first frame 18 is secured, the torque arm structure may also be attached to the surface of the reduction gear 14 opposite to the first frame 18. Moreover, when the second structure 104 is fixed to an outer member other than the first frame 18, the torque arm structure may also be attached to the front surface side in FIG. 1.

Figure 3:
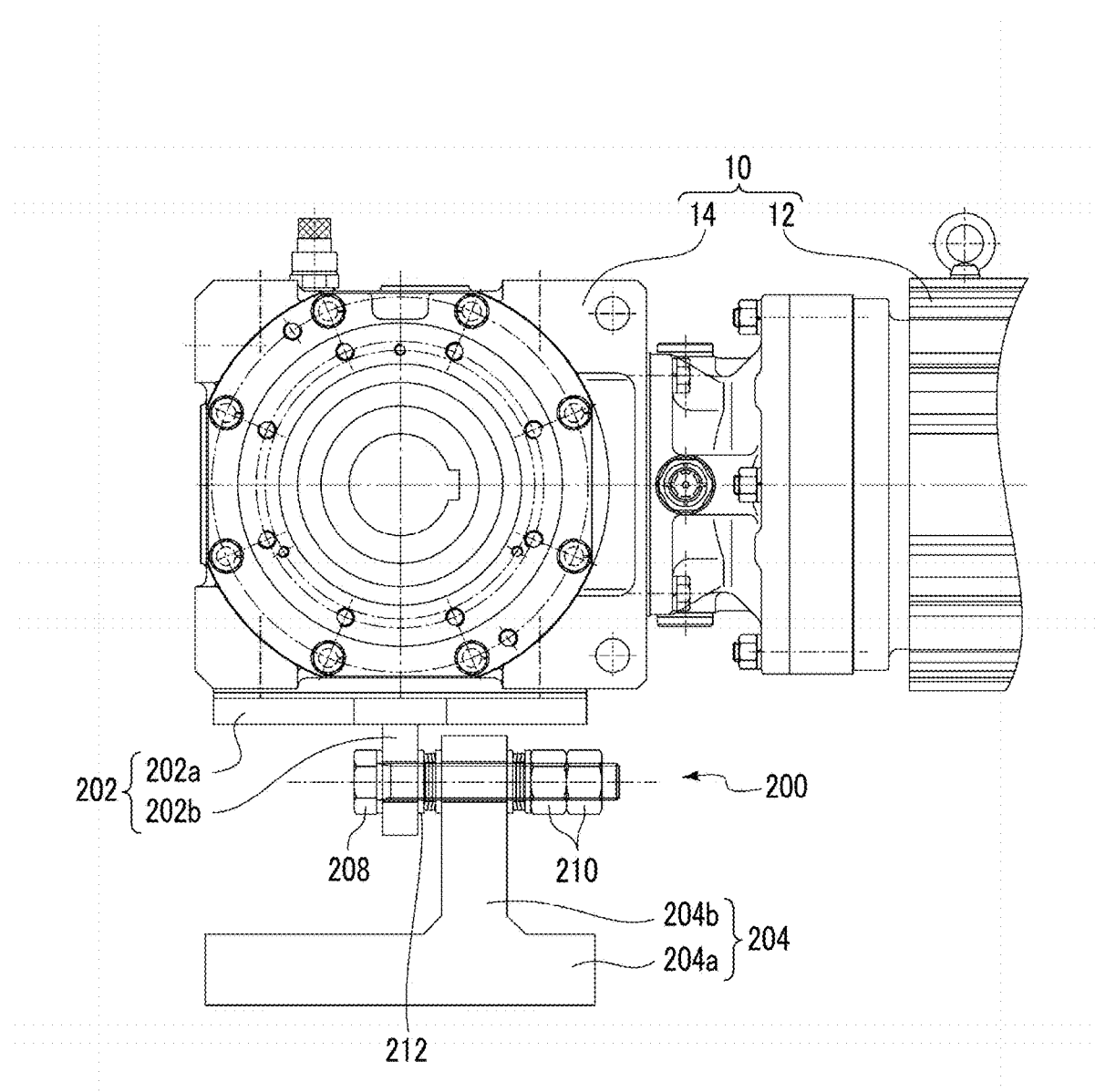
FIG. 3 is a view showing a torque arm structure according to the related art.

FIG. 3 is a view showing a torque arm structure 200 according to the related art. The torque arm structure 200 includes a first structure 202 which is fixed to the reduction gear 14, and a second structure 204 which is fixed to an outer member such as the case of a machine which is driven by the gear motor 10. The first structure 202 includes a base portion 202a which is fixed to one side surface of the reduction gear 14, and a first member 202b which is erected to extend in a vertical direction from the base portion 202a. The second structure 204 includes a base portion 204a which is fixed to one surface of the outer member, and a second member 204b which is erected to extend in a vertical direction from the base portion 204a. The first structure 202 and the second structure 204 are disposed to oppose each other so that the first member 202b and the second member 204b face each other with a slight gap therebetween.

A bolt hole (not shown) is provided on each of the first member 202b of the first structure and the second member 204b of the second structure. A bolt 208 is inserted into the bolt hole, a nut 210 is fastened to the bolt, and thus, the first structure 202 and the second structure 204 are fastened together. In order to absorb the impact when the gear motor starts or stops, a disk spring 212 or a rubber bushing is interposed between the first member 202b of the first structure and the second member 204b of the second structure.

As described above, when the gear motor and the outer member are connected to each other by the bolt or the like, it is necessary to accurately position the first structure and the second structure so that the bolt holes opened to the first member and the second member match with each other. Accordingly, particularly, when the outer member is a large-sized machine, significant labor and time are required for attaching the torque arm structure. Moreover, the impact cannot be absorbed by the torque arm structure if the bolt is too loose, the first member or the second member is broken if the bolt is too tight, and it is difficult to manage the fastening torque of the bolt in these cases.

Accordingly, in the present embodiment, a torque arm structure in which attachment and maintenance are easy is provided.

FIGS. 4A and 4B are a side view and a front view of an example of the torque arm structure according to the present embodiment.

The torque arm structure 40 includes a first structure 42 which is fixed to the reduction gear 14, and a second structure 44 which is fixed to an outer member such as the case of a machine driven by the gear motor 10. The first structure 42 includes a base portion 42a which is fixed to one side surface of the reduction gear 14, and a first member 42*b* which is erected to extend in a vertical direction from the base portion 42*a*. The second structure 44 includes a base portion 44*a* which is fixed to one surface of the outer member, and a second member 44*b* which is erected to extend in a vertical direction from the base portion 44*a*.

The first structure 42 and the second structure 44 are disposed to oppose each other so that the first member 42*b* and the second member 44*b* face each other with a gap therebetween.

An elastic member 46 is provided between the first structure 42 and the second structure 44. The elastic member 46 is formed in advance to fit in a gap which is defined between the first structure 42 and the second structure 44. More specifically, the elastic member 46 is formed in an approximately rectangular parallelepiped shape which has approximately the same height as the separation distance between the base portion 42*a* of the first structure 42 and the base portion 44*a* of the second structure 44. In the elastic member 46, a concave portion which is fitted to the first member 42*b* of the first structure 42 and a concave portion which is fitted to the second member 44*b* of the second structure 44 are formed.

When the torque arm structure 40 is installed between the gear motor 10 and the outer member, first, the first structure 42 is fixed to the reduction gear 14, and the second structure 44 is fixed to the outer member. Subsequently, the concave portions of the elastic member 46 are positioned relative to the first member 42*b* and the second member 44*b*, and the elastic member 46 is inserted in a direction (a direction perpendicular to the paper surface of FIG. 4B) in which the output shaft of the reduction gear 14 extends. As a result, the elastic member 46 connects the first structure 42 and the second structure, and transmits the load by which the reduction gear 14 is rotated around the output shaft from the first member 42*b* to the second member 44*b*.

The elastic member 46 is detachably disposed between the first structure 42 and the second structure 44. Accordingly, the elastic member can be relatively easily inserted using a hand, a hammer, or the like after the first and second structures are assembled. However, the concave portions of the elastic member are formed to have tightness to an extent that the elastic member does not detach when the gear motor is operated.

As shown in FIG. 4B, the first member 42*b* of the first structure and the second member 44*b* of the second structure are disposed so as to be offset from each other. Preferably, the offset opposes the rotation direction around the output shaft of the reduction gear 14. The example shown in FIG. 4*b* is the torque arm structure which is suitable for a case in which the output shaft of the reduction gear is rotated in only a clockwise direction and the torque arm structure receives the reaction force which rotates the reduction gear in a counterclockwise direction. If the output shaft of the reduction gear is rotated in a counterclockwise direction, the elastic member of the portion indicated by B2 in FIG. 4B is compressed between the first member 42*b* and the second member 44*b*, and thus, the rotation of the reduction gear 14 stops and an impact load is absorbed.

For example, the elastic member 46 is formed of natural rubber or synthetic rubber such as urethane rubber. Stiffness of the elastic member 46 is selected based on the magnitude of the output, operation frequency, or the like of the gear motor 10 so that the elastic member 46 does not deteriorate prematurely.

As shown in FIG. 4A, the first member 42*b* is formed in a rectangular shape and the second member 44*b* is formed in a trapezoidal shape. However, other shapes may be adopted. In general, it is preferable that an area of a portion at which the first member 42*b* and the second member 44*b* overlap with each other is wide. However, the area is appropriately selected based on the magnitude of the output or the operation frequency of the gear motor 10, the easiness of the insertion of the elastic member 46, or the like.

Figure 5:
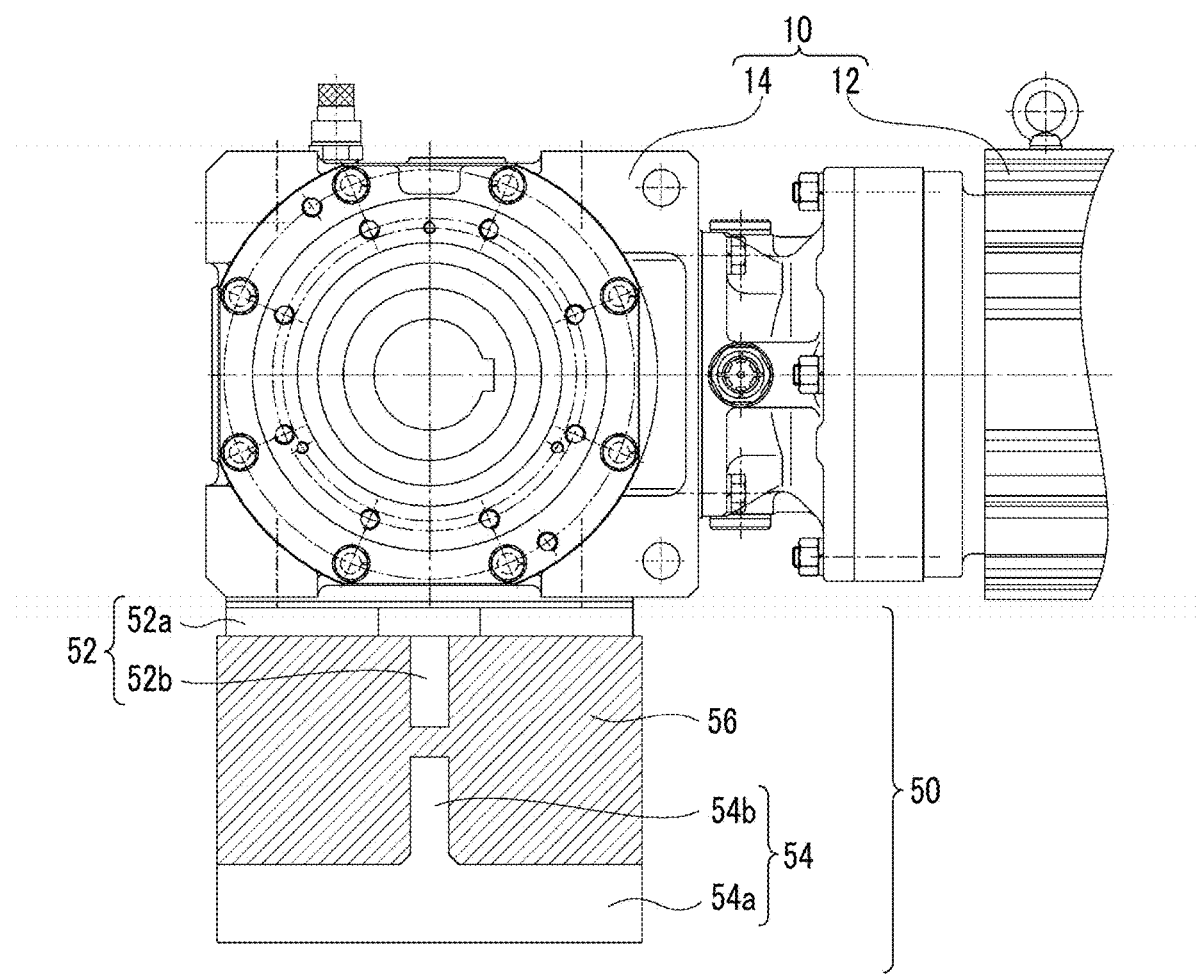
FIG. 5 is a view showing a torque arm structure according to a first modification.

FIG. 5 is a view showing the torque arm structure 50 according to a first modification of the present embodiment.

The torque arm structure 50 includes a first structure 52 which is fixed to the reduction gear 14, and a second structure 54 which is fixed to an outer member such as the case of a machine which is driven by the gear motor 10. The first structure 52 includes a base portion 52*a* which is fixed to one side surface of the reduction gear 14, and a first member 52*b* which is erected to extend in a vertical direction from the base portion 52*a*. The second structure 54 includes a base portion 54*a* which is fixed to one surface of the outer member, and a second member 54*b* which is erected to extend in a vertical direction from the base portion 54*a*.

An elastic member 56 is provided between the first structure 52 and the second structure 54. The elastic member 56 is formed in advance to fit in a gap which is defined between the first structure 52 and the second structure 54. More specifically, the elastic member 56 is formed in an approximately rectangular parallelepiped shape which has approximately the same height as the separation distance between the base portion 52*a* of the first structure 52 and the base portion 54*a* of the second structure 54. In the elastic member 56, a concave portion which is fitted to the first member 52*b* of the first structure 52 and a concave portion which is fitted to the second member 54*b* of the second structure 54 are formed.

Unlike in the example shown in FIG. 4, in the torque arm structure 50, the first member 52*b* and the second member 54*b* are not offset from each other, and are disposed on the same line in the vertical direction. That is, the first member 52*b* and the second member 54*b* do not oppose each other in the rotation direction around the output shaft of the reduction gear 14, and tip surfaces of the first member 52*b* and the second member 54*b* are disposed to oppose each other with a gap therebetween. The torque arm structure 50 is suitable for use in a case in which the output shaft of the reduction gear 14 is rotated in both a clockwise direction and a counterclockwise direction. In this structure, since only the elastic member 56 receives the rotation of the reduction gear 14, the widths of both elastic members of the first member 52*b* and the second member 54*b* are large.

Figure 6:
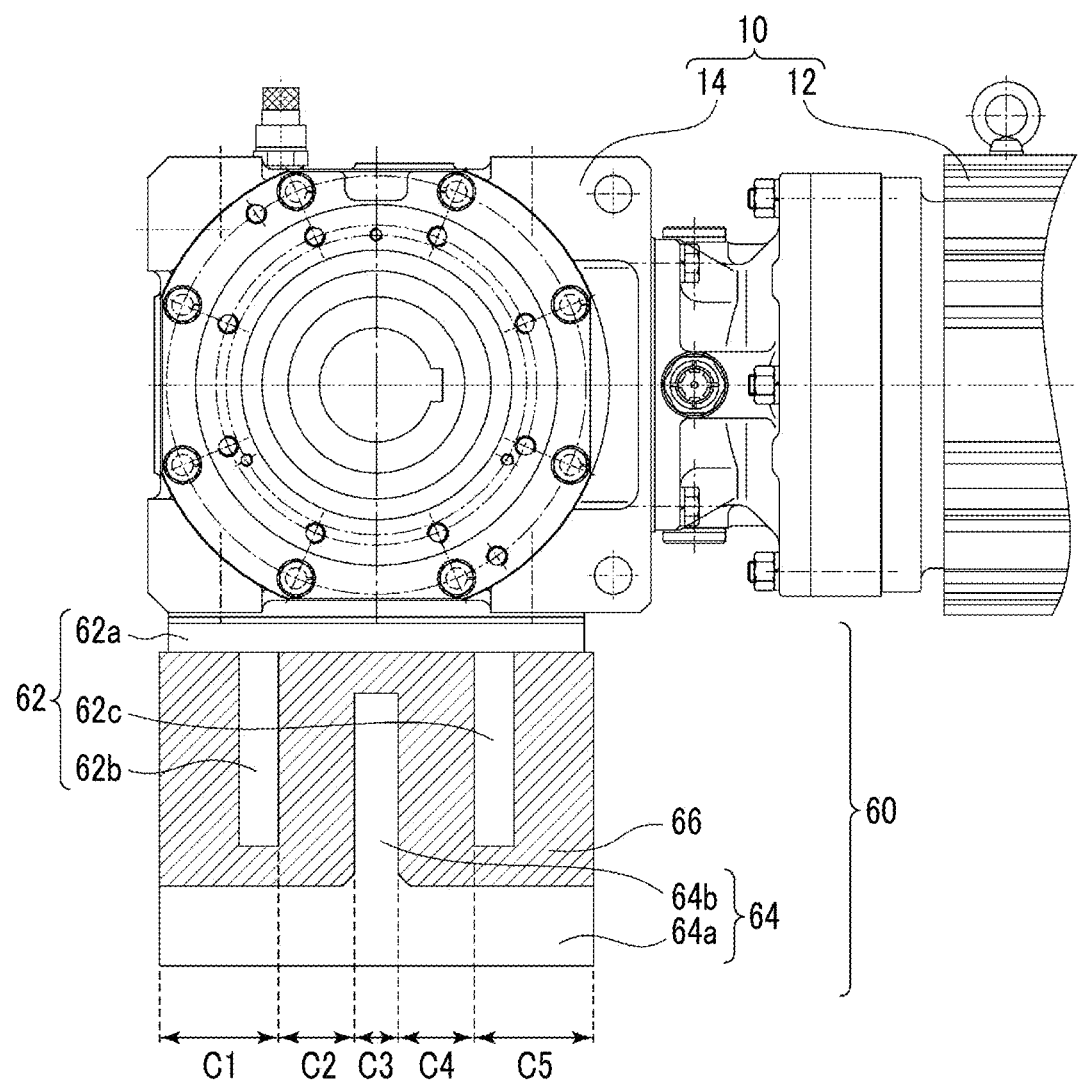
FIG. 6 is a view showing a torque arm structure according to a second modification.

FIG. 6 is a view showing the torque arm structure 60 according to a second modification of the present embodiment.

The torque arm structure 60 includes a first structure 62 which is fixed to the reduction gear 14, and a second structure 64 which is fixed to an outer member such as the case of a machine which is driven by the gear motor 10. The first structure 62 includes a base portion 62*a* which is fixed to one side surface of the reduction gear 14, and first two members 62*b* and 62*c* which are erected to extend in a vertical direction from the base portion 62*a*. The second structure 64 includes a base portion 64*a* which is fixed to one surface of the outer member, and a second member 64*b* which is erected to extend in a vertical direction from the base portion 64*a*. The first two members 62*b* and 62*c* of the first structure are disposed with the second member 64*b* of the second structure interposed therebetween. That is, the first member 62*b* and the second member 64*b*, and the first member 62*c* and the second member 64*b* oppose each other in the rotation direction around the output shaft of the reduction gear 14 with gaps therebetween.

An elastic member 66 is provided between the first structure 62 and the second structure 64. The elastic member 66 is formed in advance to fit in a gap between the first structure 62 and the second structure 64. More specifically, the elastic member 66 is formed in an approximately rectangular parallelepiped shape which has approximately the same height as the separation distance between the base portion 62a of the first structure 62 and the base portion 64a of the second structure 64. In the elastic member 66, concave portions which are fitted to the first members 62b and 62c of the first structure 62 and a concave portion which is fitted to the second member 64b of the second structure 64 are formed.

The torque arm structure 60 is suitable for the case where the output shaft of the reduction gear 14 is rotated in both a clockwise direction and a counterclockwise direction. Unlike the torque arm structure 50 shown in FIG. 5, since not only the elastic member positioned between the first and second members but also the first and second members themselves receive the rotation of the reduction gear 14, the stiffness of the torque arm structure 60 becomes larger than that of the torque arm structure 50. Accordingly, the torque arm structure 60 is suitable for use with a gear motor having high output.

Figure 7:
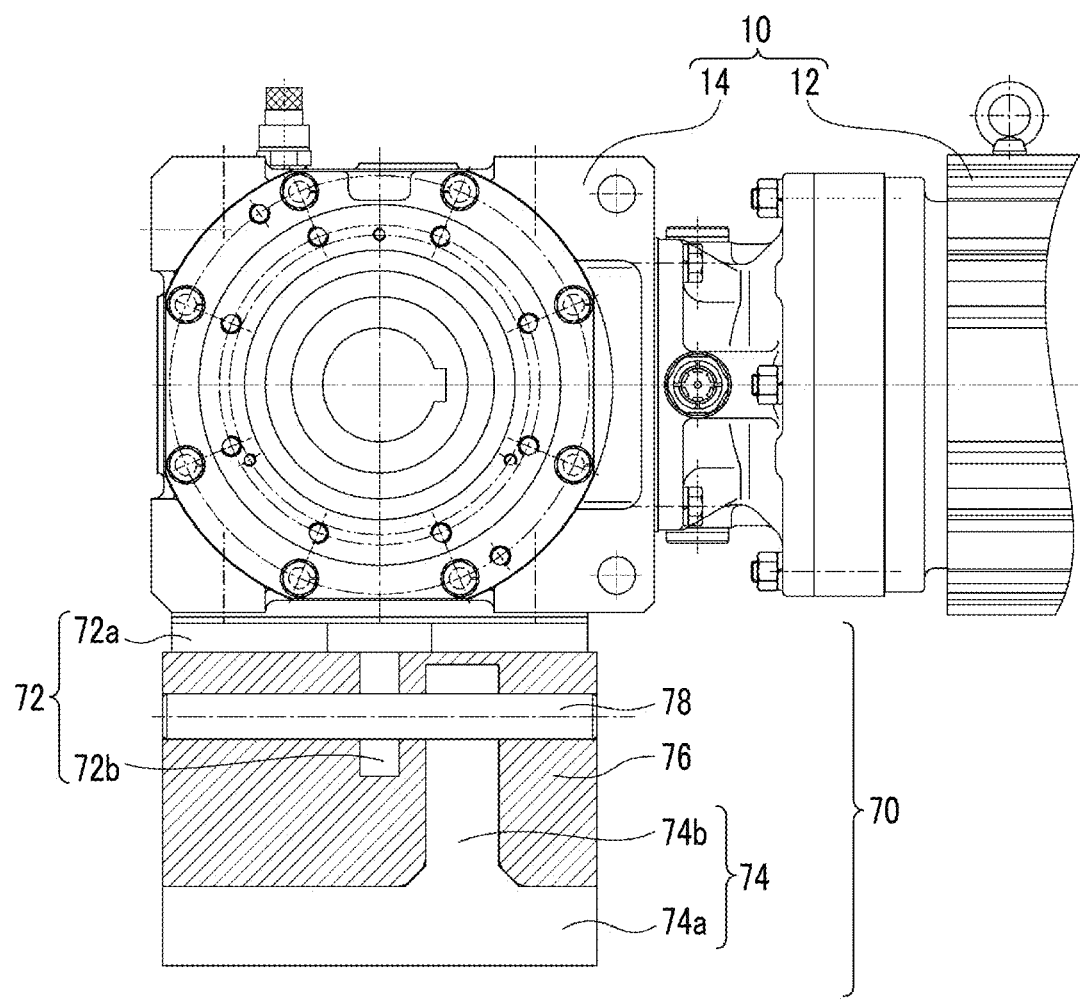
FIG. 7 is a view showing a torque arm structure according to a third modification.

FIG. 7 is a view showing the torque arm structure 70 according to a third modification of the present embodiment.

The torque arm structure 70 includes a first structure 72 which is fixed to the reduction gear 14, and a second structure 74 which is fixed to an outer member such as the case of a machine which is driven by the gear motor 10. The first structure 72 includes a base portion 72a which is fixed to one side surface of the reduction gear 14, and a first member 72b which is erected to extend in a vertical direction from the base portion 72a. The second structure 74 includes a base portion 74a which is fixed to one surface of the outer member, and a second member 74b which is erected to extend in a vertical direction from the base portion 74a.

The first structure 72 and the second structure 74 are disposed so as to oppose each other so that the first member 72b and the second member 74b face each other with a gap therebetween.

An elastic member 76 is provided between the first structure 72 and the second structure 74. The elastic member 76 is formed in advance to fit in a gap which is defined between the first structure 72 and the second structure 74. More specifically, the elastic member 76 is formed in an approximately rectangular parallelepiped shape which has approximately the same height as the separation distance between the base portion 72a of the first structure 72 and the base portion 74a of the second structure 74. In the elastic member 76, a concave portion which is fitted to the first member 72b of the first structure 72 and a concave portion which is fitted to the second member 74b of the second structure 74 are formed.

In the torque arm structure 70, a pin member 78 is loosely fitted to a through hole which is formed with the same center and the same diameter as the first member 72b, the second member 74b, and the elastic member 76. The pin member 78 functions as a locking member which prevents the elastic member 76 from being loosened and detached from the first and second structures when the gear motor 10 is repeatedly operated.

Here, FIG. 4B and FIG. 6 are referred to again. It is considered that portions of the elastic member 46 indicated by B1 and B3 in FIG. 4B almost share no load when the gear motor 10 is operated (in a clockwise direction) (when the gear motor 10 itself is rotated in a counterclockwise direction). Similarly, it is considered that portions of the elastic member 66 indicated by C1 and C5 in FIG. 6 almost share no load when the gear motor 10 is operated in a clockwise direction and a counterclockwise direction. Accordingly, the portions which almost share no load maybe removed from the elastic member to obtain a simpler structure. FIGS. 8 to 11 show such modifications.

Figure 8:
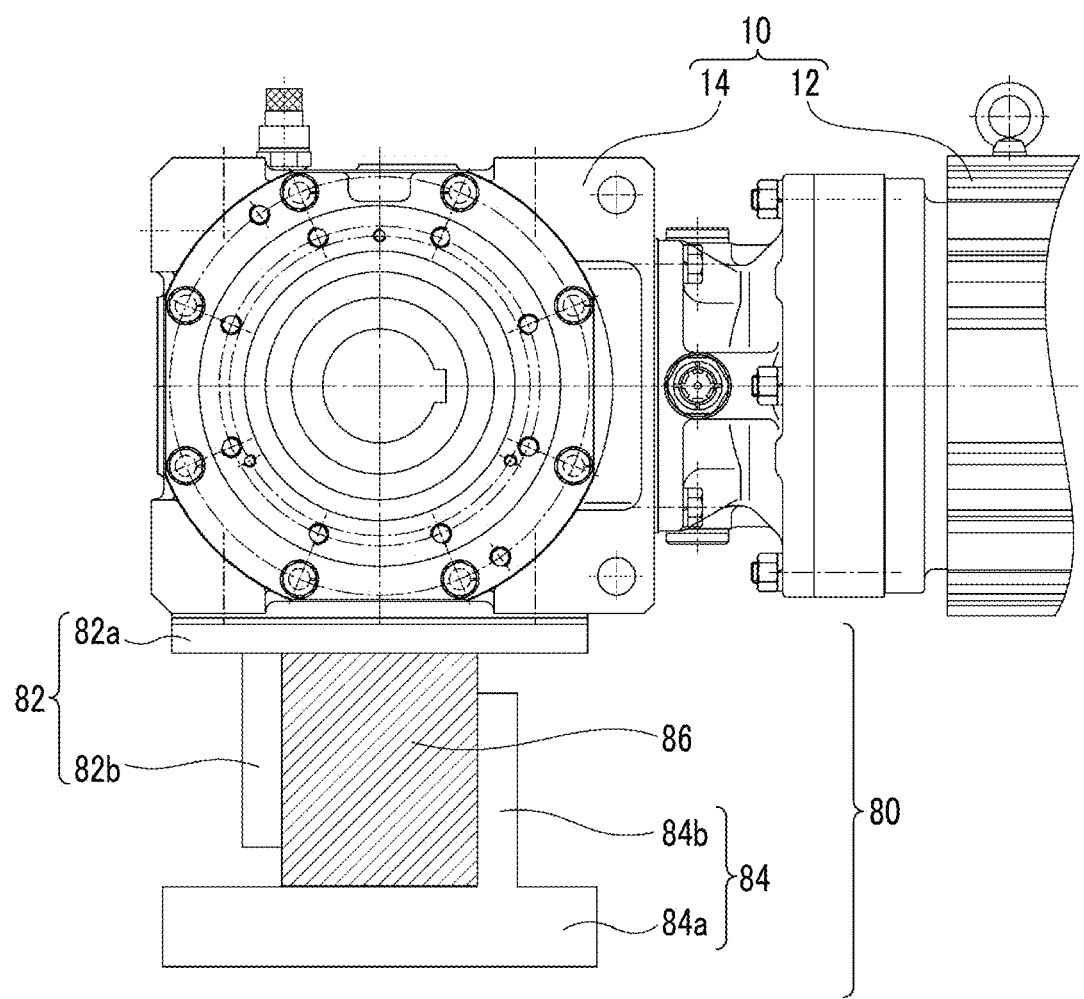
FIG. 8 is a view showing a torque arm structure according to a fourth modification.

FIG. 8 is a view showing the torque arm structure 80 according to a fourth modification of the present embodiment.

The torque arm structure 80 includes a first structure 82 which is fixed to the reduction gear 14, and a second structure 84 which is fixed to an outer member such as the case of a machine which is driven by the gear motor 10. The first structure 82 includes a base portion 82a which is fixed to one side surface of the reduction gear 14, and a first member 82b which is erected to extend in a vertical direction from the base portion 82a. The second structure 84 includes a base portion 84a which is fixed to one surface of the outer member, and a second member 84b which is erected to extend in a vertical direction from the base portion 84a.

The first structure 82 and the second structure 84 are disposed to oppose each other so that the first member 82b and the second member 84b face each other with a gap therebetween. That is, the first member 82b and the second member 84b oppose each other with a gap in the rotation direction around the output shaft of the reduction gear 14.

An elastic member 86 is provided between the first structure 82 and the second structure 84. The elastic member 86 is formed in advance to fit in a gap which is defined between the first structure 82 and the second structure 84. More specifically, the elastic member 86 is formed in an approximately rectangular parallelepiped shape which has approximately the same height as the separation distance between the base portion 82a of the first structure 82 and the base portion 84a of the second structure 84 and does not have unevenness.

Similar to the torque arm structure 40 shown in FIG. 4B, the first member 82b and the second member 84b are disposed so as to be offset from each other, and the torque arm structure 80 is a torque arm structure which is suitable for use in the case where the output shaft of the reduction gear is operated in only a clockwise direction and the torque arm structure receives the reaction force which rotates the reduction gear in a counterclockwise direction. In addition, in the torque arm structure 80, the first member 82b is not disposed immediately below (the center of) the output shaft of the reduction gear 14 and is disposed so as to be offset from each other. As a result, the elastic member 86 which is interposed between the first member 82b and the second member 84b becomes quite thick. Accordingly, since an absorption amount of the impact load of the reduction gear 14 is increased, the torque arm structure 80 is particularly suitable for a gear motor having high output.

Figure 9:
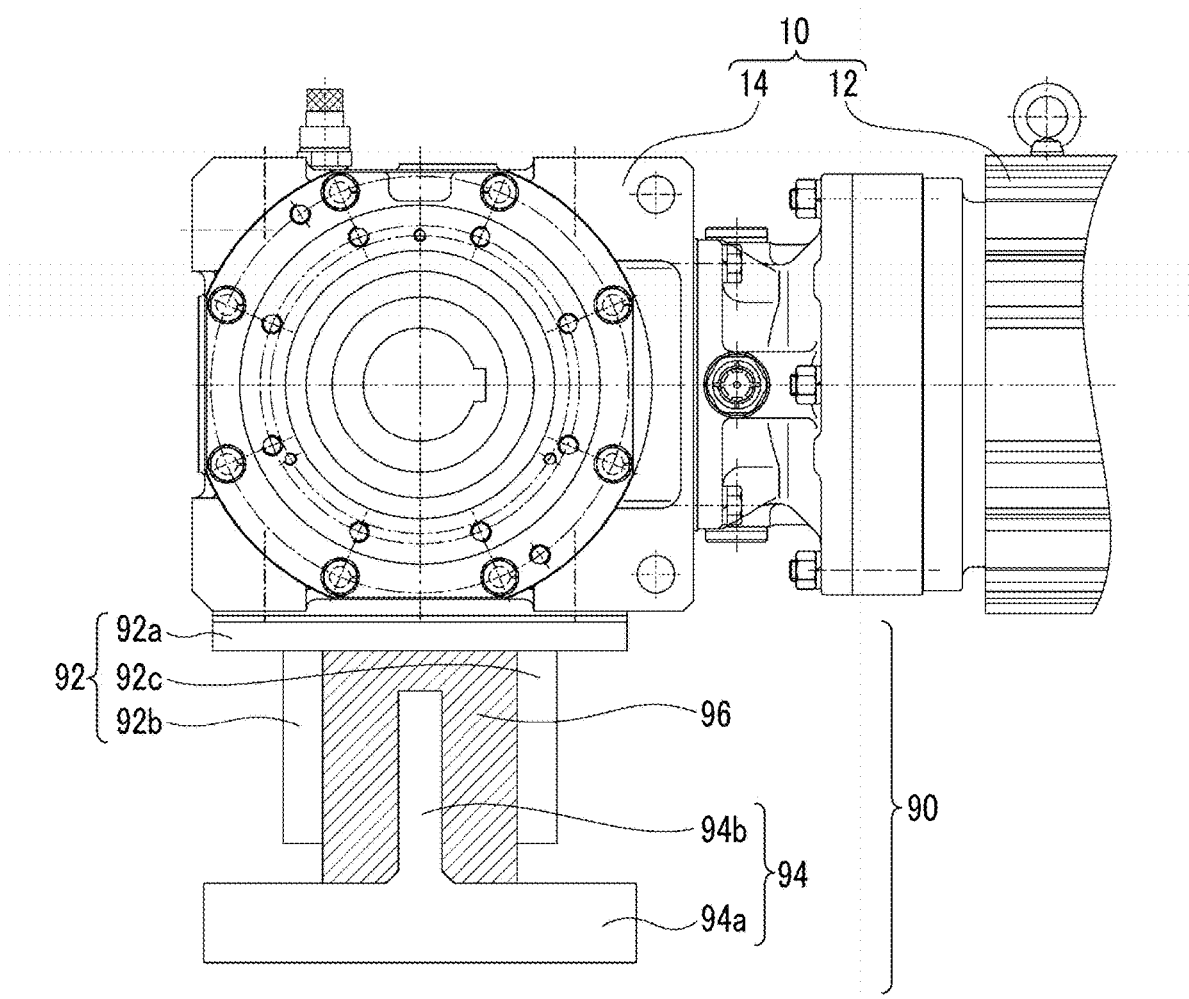
FIG. 9 is a view showing a torque arm structure according to a fifth modification.

FIG. 9 is a view showing the torque arm structure 90 according to a fifth modification of the present embodiment.

The torque arm structure 90 includes a first structure 92 which is fixed to the reduction gear 14, and a second structure 94 which is fixed to an outer member such as the case of a machine which is driven by the gear motor 10. The first structure 92 includes a base portion 92a which is fixed to one side surface of the reduction gear 14, and first two members 92b and 92c which are erected to extend in a vertical direction from the base portion 92a. The second structure 94 includes a base portion 94a which is fixed to one surface of the outer member, and a second member 94*b* which is erected to extend in a vertical direction from the base portion 94*a*. The first two members 92*b* and 92*c* of the first structure are disposed with the second member 94*b* of the second structure interposed therebetween. That is, the first member 92*b* and the second member 94*b*, and the first member 92*c* and the second member 94*b* oppose each other in the rotation direction around the output shaft of the reduction gear 14 with gaps therebetween.

An elastic member 96 is provided between the first structure 92 and the second structure 94. The elastic member 96 is formed in advance to fit in a gap which is defined between the first structure 92 and the second structure 94. More specifically, the elastic member 96 is formed in an approximately rectangular parallelepiped shape which has approximately the same height as the separation distance between the base portion 92*a* of the first structure 92 and the base portion 94*a* of the second structure 94. In the elastic member 96, a concave portion which is fitted to the second member 94*b* of the second structure 94 is formed. However, concave portions which are fitted to the first members 92*b* and 92*c* of the first structure 92 are not formed.

The torque arm structure 90 according to this modification has a function similar to the torque arm structure 60 shown in FIG. 6. However, the torque arm structure 90 has a simpler elastic member than the torque arm structure 60.

FIG. 10 is a view showing the torque arm structure 100 according to a sixth modification of the present embodiment.

The torque arm structure 100 includes a first structure 102 which is fixed to the reduction gear 14, and a second structure 104 which is fixed to an outer member such as the case of a machine which is driven by the gear motor 10. The first structure 102 includes a base portion 102*a* which is fixed to one side surface of the reduction gear 14, and a first member 102*b* which is erected to extend in a vertical direction from the base portion 102*a*. The second structure 104 includes a base portion 104*a* which is fixed to one surface of the outer member, and two second members 104*b* and 104*c* which are erected to extend in a vertical direction from the base portion 94*a*. The two second members 104*b* and 104*c* of the second structure are disposed with the first member 102*b* of the first structure interposed therebetween. That is, the first member 102*b* and the second member 104*b*, and the first member 102*b* and the second member 104*c* oppose each other in the rotation direction around the output shaft of the reduction gear 14 with gaps therebetween.

An elastic member 106 is provided between the first structure 102 and the second structure 104. The elastic member 106 is formed in advance to fit in a gap which is defined between the first structure 102 and the second structure 104. More specifically, the elastic member 106 is formed in an approximately rectangular parallelepiped shape which has approximately the same height as the separation distance between the base portion 102*a* of the first structure 102 and the base portion 104*a* of the second structure 104. In the elastic member 106, a concave portion which accommodates the first member 102*b* of the first structure 102 is formed. However, concave portions which accommodate the second members 104*b* and 104*c* of the second structure 104 are not formed.

The torque arm structure 100 according to this modification has a structure in which the torque arm structure 90 shown in FIG. 9 is turned upside down.

Figure 11:
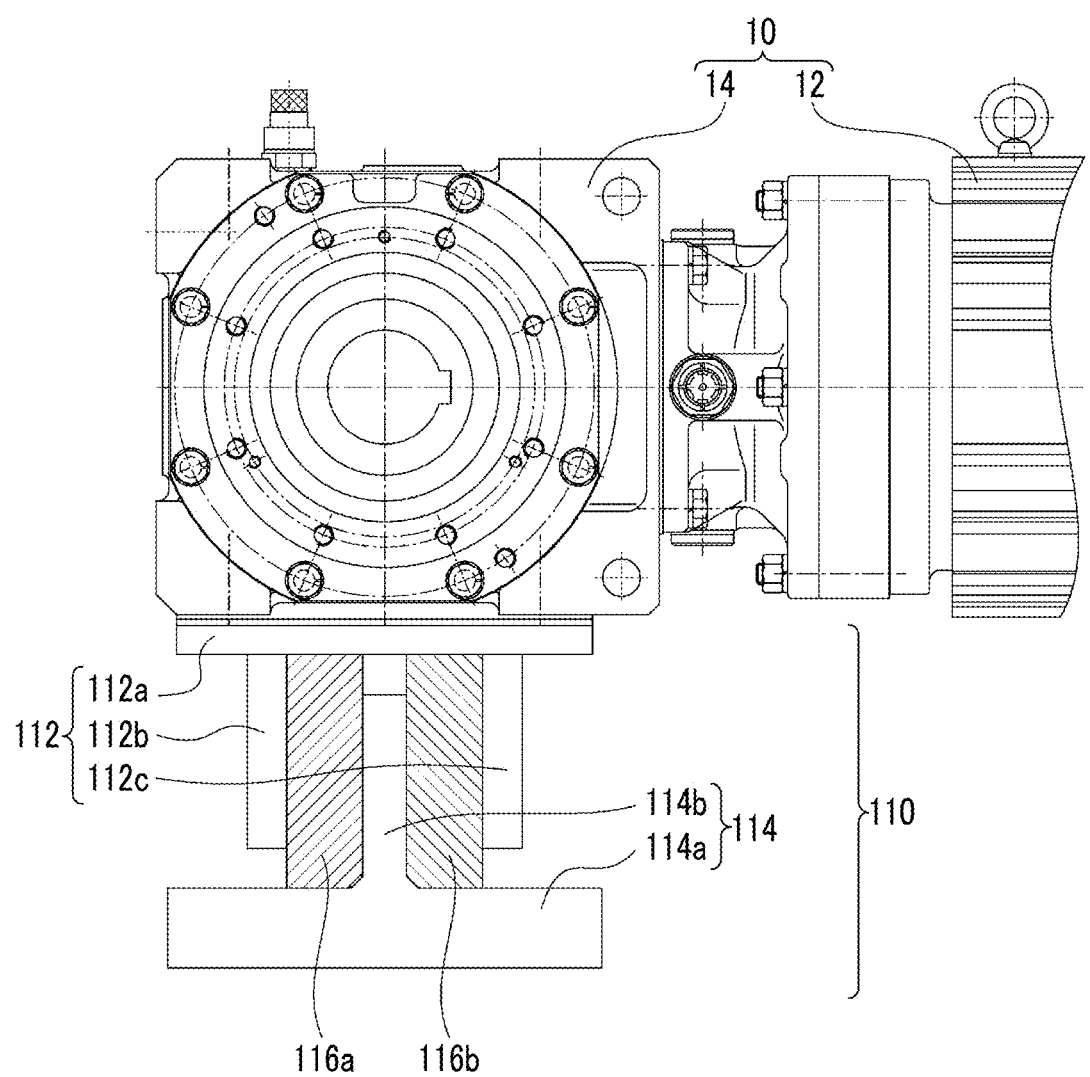
FIG. 11 is a view showing a torque arm structure according to a seventh modification.

FIG. 11 is a view showing the torque arm structure 110 according to a seventh modification of the present embodiment.

The torque arm structure 110 includes a first structure 112 which is fixed to the reduction gear 14, and a second structure 114 which is fixed to an outer member such as the case of a machine which is driven by the gear motor 10. The first structure 112 includes a base portion 112*a* which is fixed to one side surface of the reduction gear 14, and first two members 112*b* and 112*c* which are erected to extend in a vertical direction from the base portion 112*a*. The second structure 114 includes a base portion 114*a* which is fixed to one surface of the outer member, and a second member 114*b* which is erected to extend in a vertical direction from the base portion 114*a*. The first two members 112*b* and 112*c* of the first structure are disposed with the second member 114*b* of the second structure interposed therebetween. That is, the first member 112*b* and the second member 114*b*, and the first member 112*c* and the second member 114*b* oppose each other in the rotation direction around the output shaft of the reduction gear 14 with gaps therebetween.

A first elastic member 116*a* is disposed between the first member 112*b* and the second member 114*b*. A second elastic member 116*b* is disposed between the second member 114*b* and the first member 112*c*. The first elastic member 116*a* and the second elastic member 116*b* are formed in approximately rectangular parallelepiped shapes which do not have unevenness.

The torque arm structure 110 according to this modification has a function similar to the torque arm structure 60 shown in FIG. 6. However, the torque arm structure 110 has a simpler elastic member than the torque arm structure 60. Particularly, since it is not necessary to form the concave portion on the elastic member, it is possible to decrease the cost of the elastic member.

As described above, according to the present embodiment, after the first structure is attached to the reduction gear and the second structure is attached to the outer member, the torque arm structure can be configured by simply inserting the elastic member which is formed to match with the gap between the first member and the second member into the gap. Accordingly, assembly work of the torque arm structure is easily performed. In addition, since the elastic member and the first and second members are not fixed to each other, it is possible to remove only the elastic member in the state where the first structure and the second structure are attached. Accordingly, changing is easily performed when the elastic member deteriorates, and thus, maintenance performance is increased.

In addition, unlike in the related art in which the first member and the second member are fastened by a bolt, accurate positioning or the like of the bolts is not necessary, and thus, the attachment of the torque arm structure is easily performed. In general, since dimension errors are also relatively increased when the outer member to which the second structure is fixed is a large-sized machine, the characteristics are particularly advantageous. Moreover, unlike the related art, the management with respect to the fastening torque of the bolt is not needed, and damage to each member due to insufficient or excessive fastening force of the bolt also does not occur.

Above, the configuration and the operation of the torque arm structure according to the embodiment are described. The embodiment is only an example, and thus, a person skilled in the art understands that various modifications can be applied to combinations of each component, and the modifications are within a scope of certain embodiments of the invention.

In the embodiment, the first structure and the second structure are rectangular plates or trapezoidal plates. However, other shapes may be adopted if the cross sectional area capable of sufficiently transmitting the rotation load from the first structure to the second structure is provided.

In the embodiment, the case where the output shaft of the reduction gear is a hollow shaft is described. However, certain embodiments of the invention are not limited to this, and for example, the output shaft may be a solid shaft.

In the embodiment, the case where one torque arm structure is provided is described. However, certain embodiments of the invention are not limited to this, and two or more torque arm structures may be provided.

In the embodiment, the case where the motor is not controlled by the inverter is described. However, certain embodiments of the invention are not limited to this, and for example, control using the inverter may be performed.

In the embodiment, the case where the reduction gear is the orthogonal reduction gear is described. However, certain embodiments of the invention are not limited to this, and for example, the reduction gear may be a parallel shaft reduction gear.

In the embodiment, the case where the torque arm structure is provided on the gear motor of the conveyor belt system is described. However, usage of the torque arm structure according to certain embodiments of the invention is not particularly limited, and for example, the torque arm structure may be provided on a gear motor in a traveling device of a crane.

In the embodiment, the case where the second member is fixed to the outer member such as the case of the machine driven by the gear motor is described. However, the fixed portion may be members other than the reduction gear, and for example, the second member may be fixed to a floor or the like. In addition, the first member is not fixed to the reduction gear, and may be fixed to a member integrated with the reduction gear. For example, the first member may be fixed to the motor.

In the present specification, the expression that the first member is "fixed" to the reduction gear or the member integrated with the reduction gear also includes a case where the first member is integrally formed with the reduction gear or the member integrated with the reduction gear. Similarly, the expression that the second member is "fixed" to the outer member or the like also includes a case where the second member is integrally formed with the outer member or the like.

In the embodiment, the configuration in which the base portion of the first structure and the base portion of the second structure are disposed to oppose each other is described. However, certain embodiments of the invention are not limited to this. For example, the base portion of the first structure and the base portion of the second structure may be disposed to be orthogonal to each other if side surfaces or tip surfaces of the first member and the second member oppose each other with a gap therebetween.

It should be understood that the invention is not limited to the above-described embodiment, and may be modified into various forms on the basis of the spirit of the invention. Additionally, the modifications are included in the scope of the invention.

What is claimed is:

1. A torque arm structure configured to prevent rotation around an output shaft of a reduction gear, comprising:
    a first member which is fixed to the reduction gear or a member integrated with the reduction gear;
    a second member which is fixed to an outer member and opposes the first member; and
    an elastic member configured to transmit a load by which the reduction gear is rotated around the output shaft from the first member to the second member,
    wherein the elastic member is in a gap between the first member and the second member, and the elastic member includes a concave portion which is fitted to at least one of the first member and the second member.

2. The torque arm structure according to claim 1, wherein the first member and the second member oppose each other in a rotation direction around the output shaft of the reduction gear.

3. The torque arm structure according to claim 2, wherein two first members are provided, and the second member is disposed between the two first members.

4. The torque arm structure according to claim 3, wherein the elastic member includes a concave portion which is fitted to the second member.

5. The torque arm structure according to claim 2, wherein two second members are provided, and the first member is disposed between the two second members.

6. The torque arm structure according to claim 5, wherein the elastic member includes a concave portion which is fitted to the first member.

7. A torque arm structure configured to prevent rotation around an output shaft of a reduction gear, comprising:
    a first member which is fixed to the reduction gear or a member integrated with the reduction gear;
    a second member which is fixed to an outer member and opposes the first member;
    an elastic member configured to transmit a load by which the reduction gear is rotated around the output shaft from the first member to the second member; and
    a locking member for the elastic member,
    wherein the elastic member is in a gap between the first member and the second member.

8. The torque arm structure according to claim 7, wherein the locking member is a pin member which penetrates the first member, the second member, and the elastic member.

* * * * *